May 8, 1934.   J. H. H. VOSS   1,958,219
AUTOMATIC RING PLATE VALVE
Filed March 7, 1931
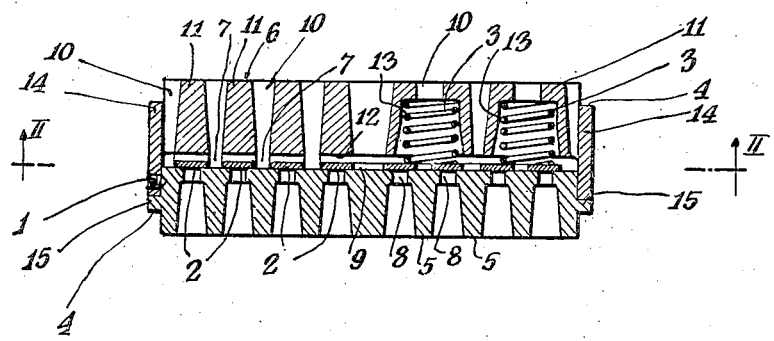
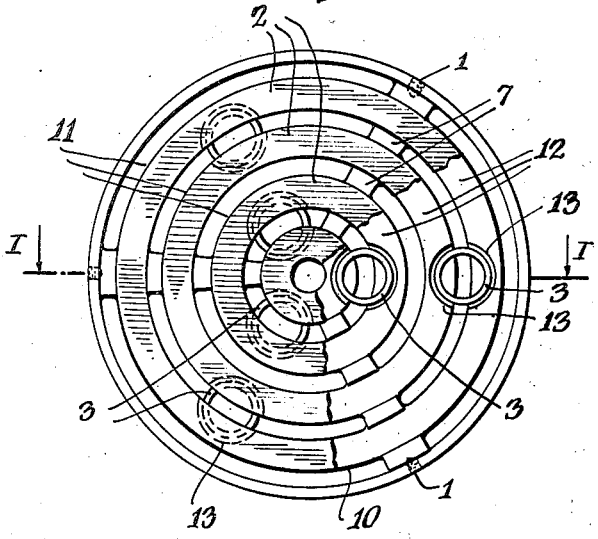
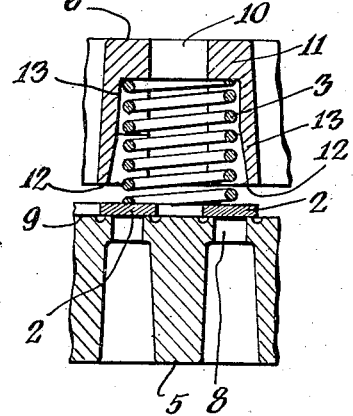
Inventor
Johann Heinrich Hermann Voss
By his Attorney Patented May 8, 1934

1,958,219

UNITED STATES PATENT OFFICE 1,958,219

AUTOMATIC RING PLATE VALVE

Johann Heinrich Hermann Voss, White Plains, N. Y.

Application March 7, 1931, Serial No. 520,764

3 Claims. (Cl. 277—60)

My invention relates to automatic ring plate valves, in which the moving valve plates consist of thin, flat and individual ring plates which are held in closed position over circular ports in the valve seat by spring action and are opened by the flowing medium. In the well known valves of this type safety of operation is endangered through the loosening and breaking of bolts, nuts, clamps and other means holding the different portions together; furthermore, these fastenings reduce the effective passage area by taking up much space within the structure of the valve, and, finally the springs provided for closing pressure soon become ineffective and are, due to their shape, proportion and manner of mounting, subject to considerable wear and tear, either through excessive bending stresses, resulting in frequent breakages when made of apparently heavy material, or, due to high discharge temperatures, to early annealing, with consequent loss of elasticity, if made of lighter material.

A primary object of my invention is to provide a ring plate valve to which the defects described above are not attached, and which is particularly adapted for use in pumps for conveying liquids and gases. To this end I provide a valve housing assembly with peripheral rim and shoulder engagement requiring neither bolt nor other fastening within its circular structure, thus making the entire valve surface available for the location of effective passage area. I further provide springs seating over two or more valve plates, housing them in self-ventilating and self-cleaning cavities or recesses of the valve guard in such a manner that, due to their resulting large size, they vibrate freely at high speed and in high temperatures without being subject to excessive bending stress or annealing.

One illustrative embodiment of my invention is represented by way of example in the accompanying drawing, wherein:

Fig. 1 is a central cross sectional elevation on the line 1—1 of Figure 2, showing the valve seat, valve guard, the ring plates and springs, and other portions.

Fig. 2 is an inverted plan view of the valve guard seen along the line 2—2 of Figure 1.

Fig. 3 shows a spring cavity or socket on an enlarged scale.

The valve casing consists of two sections registering on their periphery in a rim and shoulder engagement secured with three or more set screws 1, with the valve plates 2 and their springs 3, housed between them and with appropriate external surfaces or collars, 4, whereby the assembled parts may be clamped into the compressor structure. Both casing sections are, or may be, simple castings, the section marked 5 forming the valve seat and the other, marked 6, being the valve guard having guide lugs, 7, which retain the valve plates in position.

For a multi-ported valve of the kind here shown the seating part 5 is cast with four or more concentrical circular port slots 8 of proper width suited to the circular contour of the structure. The upper or inner ends of all these port slots terminate at a common seat surface 9, which surface is a plane and hence easily produced in its finished form by ordinary tools. The valve guard section is formed with flow slots 10, in similar concentrical arrangement to the port slots 8, but offset relatively thereto so that when the sections are united the walls or ribs 11 between the said flow slots are disposed in a staggered position over the port slots.

The faces 12 of these wall portions of the valve guard section thus opposed to the port slots, form the backing surfaces for the valve plates 2 and are formed by turning away the metal between the guide lugs forming a recess or chamber deep enough to accommodate the valve plate and afford it an adequate lift. The peripheral flow slot 10 is walled on the outside by the rim 14 extending beyond the seat surface 9 to engage the valve seat 5 on the shoulder 15 far enough to locate three or more set screws 1 which hold the guard section 6 in registry over the seat section 5. The set screws 1 being very small, actually only $\frac{1}{8}$" to $\frac{1}{6}$" diameter, serve only to lock the valve sections together when not in use. When the valve is in actual operation it is clamped into the compressor assembly with powerful yokes pressing on the shoulders 4, securely holding the valve sections together in operating condition, thus relieving the set screws 1 from any strain or burden.

It will be noted that assembled in this manner the two sections on their faces and within their flow slots are devoid of bolts, clamps, or other fastenings for holding them together, thus making the compressor safe from damage or even destruction through breakage of valve parts of this description, and, furthermore, the entire space within the contour of the valve is made available for the location of a large number of valve rings so that the greatest possible valve area is obtained, which is highly advantageous in any form of plate valve, as will be readily understood by those skilled in the arts.

Spring cavities or sockets are conveniently produced in the rib portions 11 of the valve guard 6 by drilling or milling into adjacent walls, so that the drill holes intersect the edges of the walls forming two opposed niches 13. Figure 3 shows on an enlarged scale that these niches snugly embrace the springs 3 in their upper part and being tapered at the lower end, nearest the abutment surfaces 12, allow them a slight side movement for adjustment of unequal lifting of the valve plates 2. As thus housed between two adjacent wall portions 11 the springs 3 extend and seat over two valve rings and, therefore, are of such size and proportions that they vibrate freely at high speed and in high temperatures without being subject to breakage through excessive bending stresses or to annealing through high discharge gas temperatures.

It is found, moreover, that by providing spring cavities of the type described the springs are well ventilated and kept clean by the flow of the gas around and through them. The spring cavities are obviously capable of different arrangement as to size and location, they may be of oblong or square cross-section and may be located around one or more of the guide lugs. The springs may also be changed as to size, their cross-section may be of square or flat material etc., and it will be understood that various changes, substitutions and modifications may be made in size and arrangement of the parts without departing from the invention, as specified in the following claims:

I claim:

1. A ring plate valve comprising united seat and guard sections loosely confining between them independent valve plates of light mass, the walls of adjoining guard sections being intersected by tapered cavities extending over two adjacent valve plates and serving to snugly house unattached closing springs, each resting against two crescent shaped bottom surfaces of each spring cavity and to allow clearance for slight tilting of the springs.

2. A ring plate valve comprising united seat and guard sections loosely confining between them independent plate valves of light mass, the walls of adjoining guard sections being intersected by tapered cavities serving to house closing springs, each resting against two crescent shaped bottom surfaces of each spring cavity and seating over adjacent valve plates and to allow clearance for slight tilting of the springs.

3. A ring plate valve comprising a casing section having a plane inner surface forming a valve seat, guard sections secured to said surface and having a central recess forming a circular chamber, valve plates loosely confined in said circular chamber, superposed seating springs each located in, and resting against two crescent shaped bottom surfaces of each ventilated cavity intersecting the walls of adjoining guard sections and each spring seating over adjacent valve plates, and flow slots formed in said guard sections to maintain active gas flow at all points of said valve seat surface.

JOHANN HEINRICH HERMANN VOSS.